United States Patent
Jacobs

(10) Patent No.: US 7,466,449 B2
(45) Date of Patent: Dec. 16, 2008

(54) SYSTEM AND METHOD FOR CONTROLLING OUTPUT QUALITY

(75) Inventor: Brandon E. Jacobs, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 788 days.

(21) Appl. No.: 10/954,867

(22) Filed: Sep. 30, 2004

(65) Prior Publication Data

US 2006/0072132 A1   Apr. 6, 2006

(51) Int. Cl.
*G06F 15/00* (2006.01)
*H04N 1/393* (2006.01)
*H04N 1/04* (2006.01)

(52) U.S. Cl. .................. 358/1.9; 358/1.2; 358/451; 358/474

(58) Field of Classification Search ............... 358/1.9, 358/1.15, 474, 504–505, 471, 406, 412, 483, 358/486, 497, 409, 1.2, 451; 400/61; 399/227; 345/204
See application file for complete search history.

(56) References Cited

U.S. PATENT DOCUMENTS

| | | | |
|---|---|---|---|
| 4,614,421 A | 9/1986 | Nishiyama | |
| 4,755,852 A * | 7/1988 | Fujita | 399/15 |
| 6,104,508 A | 8/2000 | Miyazaki | |
| 6,374,056 B1 | 4/2002 | Umetsu et al. | |
| 6,388,773 B1 | 5/2002 | Smith et al. | |
| 6,483,999 B1 | 11/2002 | Anderson et al. | |
| 6,697,166 B1 | 2/2004 | Minamizawa | |
| 6,714,317 B2 | 3/2004 | Lu | |
| 6,761,493 B1 * | 7/2004 | Hooper et al. | 400/61 |
| 6,972,876 B2 * | 12/2005 | Yokochi | 358/471 |
| 7,113,181 B2 * | 9/2006 | Tey et al. | 345/204 |
| 2002/0033974 A1 * | 3/2002 | Chen et al. | 358/474 |
| 2002/0051249 A1 | 5/2002 | Lu | |
| 2004/0212825 A1 * | 10/2004 | Sai et al. | 358/1.15 |
| 2005/0078983 A1 * | 4/2005 | Maruyama et al. | 399/227 |
| 2005/0286094 A1 * | 12/2005 | Han et al. | 358/474 |
| 2006/0092467 A1 * | 5/2006 | Dumitrescu et al. | 358/1.15 |

* cited by examiner

*Primary Examiner*—Edward L. Coles
*Assistant Examiner*—Charlotte M Baker

(57) ABSTRACT

A system and method for controlling output quality based on the time interval that a button is engaged to initiate output is pressed. The system and method provide for an output quality of a first category when the button is engaged for a first time interval and initiates output quality of a second category when the button is engaged for a second time interval.

58 Claims, 2 Drawing Sheets

US 7,466,449 B2

SYSTEM AND METHOD FOR CONTROLLING OUTPUT QUALITY

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to scanners and scanning methods, and more particularly to those having or using a scan-bar homing reference.

The present invention relates generally to printing devices, and more specifically to a system and method for controlling the output quality of a printing device.

2. Description of the Related Art

Use in the home and office of photocopiers, scanners, printers, and so-called "all-in-one" devices that combine scanning, printing, and other functionality into one unit has grown rapidly in recent years. It is common to use such devices in a stand-alone mode as a photocopier or to print directly from a memory card without the use of a separate personal computer connected to the device. When using such devices in this manner, it is often desirable to adjust the output quality of the image being printed. Conventional ways to adjust the output quality include the use of a series of menus and buttons on the device's control panel to select the desired quality. This often requires an understanding of how to navigate through the various menus, consumes time to finally select the desired output quality, and adds cost to the control systems needed to adjust output quality. As a result, there exists a continuing need for a simplified way to control the output quality of an image.

SUMMARY OF THE INVENTION

The present invention provides a system and method for controlling output quality using a button that is engaged to initiate output and a device control unit in communication with the button. The device control unit measures the time interval during which the button is engaged by a user and initiates an output quality of a first category when the button is engaged for a first time interval and an output quality of a second category when the button is engaged for a second time interval. In one aspect of the present invention, the first time interval is less than two seconds, the second time interval is two or more seconds, and the output quality of the first category is of a lower resolution than the output quality of the second category.

In another aspect of the present invention, the device control unit initiates an output quality of less than 300 dots-per-inch horizontal and 600 dots-per-inch vertical when the button is engaged for an interval of less than two seconds and an output quality of at least 300 dots-per-inch horizontal and 600 dots-per-inch vertical when the button is engaged for an interval of at least two seconds. The present invention also can be used to initiate color and black-and-white output.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "in communication with," "connected," and "coupled" and variations thereof are not restricted to physical or mechanical connections or couplings.

The present invention provides a system and method for controlling output quality based upon the time interval that the button used to initiate the output is engaged. The term image as used herein encompasses any printed or digital form of text, graphic, or combination thereof. The term output as used herein encompasses output from any printing device such as color and black-and-white copiers, color and black-and-white printers, and so-called "all-in-one devices" that incorporate multiple functions such as scanning, copying, and printing capabilities in one device. Such printing devices may utilize ink jet, dot matrix, dye sublimation, laser, and any other suitable print formats. The term button as used herein means any component, whether a physical component or graphic user interface icon, that is engaged to initiate output.

Figure 1:
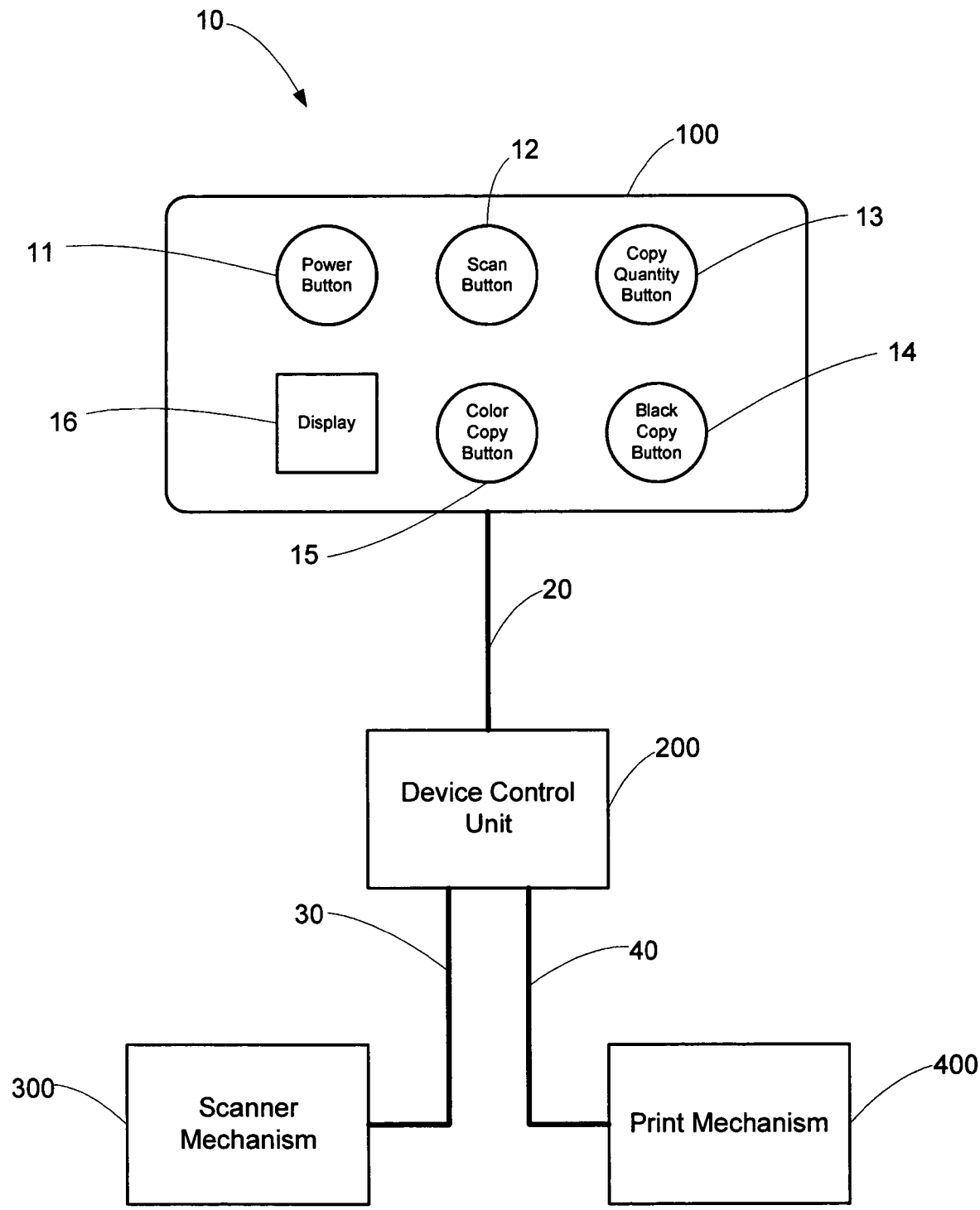
FIG. 1 is a block diagram of the various components typically used in connection with the present invention.

A block diagram of a representative print system 10 is shown in FIG. 1. Print system 10 typically comprises a control panel 100, a device control unit 200, a scanner mechanism 300, and a print mechanism 400. Control panel 100, device control unit 200, scanner mechanism 300, and print mechanism 400 are in communication with one another. Appropriate modes of communication includes both physical connections such as USB, serial, and parallel connections, and wireless connections such as radio frequency and infrared connections, as well as any other suitable manner of connecting electronic components. As would be known to one skilled in the art, these components may be combined into a single physical unit or may be incorporated into one or more separate units as desired. Print system 10 may be in communication with one or more other computers or may operate as a stand-alone device.

Control panel 100 typically includes a power button 11, a scan button 12, a copy quantity button 13, a black copy button 14, a color copy button 15, and a display 16. The foregoing components may be included in a single unit as shown in FIG. 1 or included in two or more separate units as desired. Power button 10 is used to activate and deactivate a power supply to print system 10 and optionally may be used to cancel a command to print system 10. Copy quantity button 13 is used to select the desired number of output images. Black copy button 14 is used to initiate black-and-white output. Color copy button 15 is used to initiate color output. Display 16 is used to display information to a user (not shown) such as output quantity selected using copy quantity button 13.

Device control unit 200 typically functions to selectively coordinate the operation of and communication between control panel 100, scanner mechanism 300, and print mechanism 400. Device control unit 200 also functions to selectively control the output quality based upon the time interval that either of the black copy button 14 or color copy button 15 are engaged. In one aspect of the invention, device control unit 200 may be an application specific integrated circuit ("ASIC") programmed to carry out the functions of print system 10. Device control unit 200 typically includes an input and output ("I/O") connection 20 with control panel 100, an I/O connection 30 with scanner mechanism 300, and an I/O connection 40 with print mechanism 400. I/O connections 20, 30, and 40 can be USB, parallel, serial, wireless, or any other suitable means for connecting electronic components. Device control unit 200 typically also includes memory such as flash memory, and any other components needed for the operation of control panel 100, scanner mechanism 300, and print mechanism 400. In another aspect of the present invention, device control unit 200 is a printed circuit board assembly ("PCBA") with an integrated ASIC to carry out the foregoing functions. As would be apparent to those skilled in the art, device control unit 200 may be a single component or distributed across multiple components. In addition to the foregoing examples, device control unit 200 may comprise other components suitable for carrying out some or all of the foregoing functions.

Scanner mechanism 300 typically functions to scan an image into a digital format and to load images already stored in a digital format (e.g., stored in a flash memory card or other storage device). Scanner mechanism 300 typically is in communication with one or more of device control unit 200, print mechanism 400, and control panel 100. In one aspect of the present invention, scanner mechanism 300 is a Rohm FA13 CIS 600 pixels-per-inch ("ppi") optical scanner. As would be known to those skilled in art, charge coupled device ("CCD") and contact image sensor ("CIS") scanner mechanisms may be used as scanner mechanism 300, but any scanning device with resolution suitable for a desired application may be used. Scanner resolutions, in both the horizontal and vertical directions, useable with the present invention include 75 ppi, 150 ppi, 300 ppi, 600 ppi, 1200 ppi and 2400 ppi. Presently, scanner resolutions above 1200 ppi are achieved through interpolative techniques as is known in the art. For example, the 600 ppi or 1220 ppi resolutions can be used to provide the higher quality output copies, the 300 ppi resolution for standard quality, and the 75 ppi or 150 ppi resolution for the draft or quick quality copies. Conversely, while a 75 ppi scan resolution can be used when desiring high quality printed output, the resultant printed image based on scan data at this low resolution would not be pleasing to the eye.

Print mechanism 400 functions to generate output. In one aspect of the present invention, print mechanism 400 is a color printing device capable of generating both color and black-and-white output. Print mechanism 400 also may be capable of generating only black-and-white output. Output also includes grayscale output such as halftone images. In one aspect of the present invention, print mechanism 400 is a 4800 horizontal dpi by 1200 vertical dpi color ink-jet printer. Print mechanism 400 also may use laser, ink-jet, dye sublimation, dot-matrix, or any other suitable print technology.

Following is an example of the operation of the present invention, which is not intended to limit the scope of the present invention, as various other applications of the present invention will be apparent to those skilled in the art.

If a user (not shown) desires a color reproduction of an original color page using the fastest method to obtain the output, the user first places the original page onto the bed (not shown) of scanner mechanism 300. The user engages color copy button 15 for one second (i.e., presses and releases color copy button 15 within one second). Device control unit 200 detects that color copy button 15 has been engaged and measures the time interval that color copy button 200 is engaged. Upon measuring an interval of less than two seconds, device control unit 200 signals scanner mechanism 300 to scan the original page at 300 horizontal ppi ("hppi") by 300 vertical ppi ("vppi"), processes the scanner data, and then signals print mechanism 400 to print a 600 horizontal dpi ("hdpi") by 600 vertical dpi ("vdpi") color reproduction of the color page using no shingling to produce the fastest output.

If a user desires a high quality output color reproduction of an original color page, the user engages color copy button 15 for more than two seconds. Device control unit 200 determines that color copy button 15 has been engaged for more than two seconds, signals scanner mechanism 300 to scan the original page at 600 horizontal ppi by 600 vppi, and signals print mechanism 400 to print using 600 hdpi by 600 vdpi resolution and using 4 pass shingling to increase the quality of the reproduction.

If a user desires a grayscale reproduction of an original page using the fastest method to obtain the output, the user first places the original page onto the bed (not shown) of scanner mechanism 300. The user engages black copy button 14 for one second (i.e., presses and releases black copy button 15 within one second). Device control unit 200 detects that black copy button 14 has been engaged and measures the time interval that black copy button 200 is engaged. Upon measuring an interval of less than two seconds, device control unit 200 signals scanner mechanism 300 to scan the page at 300 hppi by 300 vppi, processes the scanner data, and then signals print mechanism 400 to print a 600 hdpi by 600 vdpi color reproduction of the color page using no shingling to produce the fastest output.

If a user desires a high quality output grayscale reproduction of an original color page, the user engages black copy button 14 for more than two seconds. Device control unit 200 determines that black copy button 14 has been engaged for more than two seconds, signals scanner mechanism 300 to scan the page at 600 hppi by 600 vppi, and signals print mechanism 400 to print using 600 hdpi by 600 vdpi resolution and using 4 pass shingling to increase the quality of the reproduction.

Of course, the time interval used to differentiate between different output quality categories, as well as particular characteristics of the different output quality categories, are not limited to those identified in the above example. In one aspect of the present invention, the time interval used for an output quality of a first category is less than two seconds and the time interval used for an output quality of a second category is at least two seconds. These time intervals may also be less than one second and at least one second, less than three seconds and at least three seconds, or any other suitable time intervals.

The output quality categories for printing the output and associated with the time intervals also can be varied to include categories such as 300 hdpi by 600 vdpi, 600 hdpi by 600 vdpi, 1200 hdpi by 1200 vdpi, 2400 hdpi by 1200 vdpi, 4800 hdpi by 1200 vdpi. In addition, the output quality category can vary according to a "shingle mode" (i.e., the number of times the print mechanism passes over a horizontal line before indexing to the next horizontal line). Such shingle modes include single-pass, two-pass, three-pass, four-pass, six-pass, eight-pass, and sixteen-pass. In another aspect of the present invention, the first category of output quality is of a lower resolution than the output quality of the second category. In another aspect, the first category of output quality is black-and-white (or monochrome) and the second category is color. In a further aspect, the first category of output quality is black and white (or monochrome) and the second is grayscale.

In yet other aspects of the present invention, the following categories of output quality may be used. The first category can be a first output orientation (e.g., portrait) and the second category can be a second output orientation (e.g., landscape). Any other suitable orientations can be used as well. The first category can be black-and-white output and the second category can be grayscale output. The first category can be output produced with a first type of ink jet cartridge and the second category can be output produced with a second type of ink jet cartridge. Additionally, the first category can be output produced with a general purpose mono ink jet cartridge, and the second category can be grayscale output produced with a general purpose color ink jet cartridge (typically characterized by the use of smaller ink drop sizes when compared with a general purpose mono ink jet cartridge). Additionally, the first category can be output produced with a general purpose color ink jet cartridge, and the second category can be output produced with a photo-quality color ink jet cartridge (typically characterized by the use of smaller ink drop size, different inks, and a separate black ink reservoir, all when compared with a general purpose color ink jet cartridge). In addition, any other method for quantifying the output characteristics of a print media may be used for the output quality category. A mono or monochrome ink jet cartridge is one that contains a single color of ink, such as black, blue, magenta, or any color, and the grayscale output from such a cartridge would match in color to the ink used, for example, a blue mono ink jet cartridge grayscale output would be blue.

Figure 2:
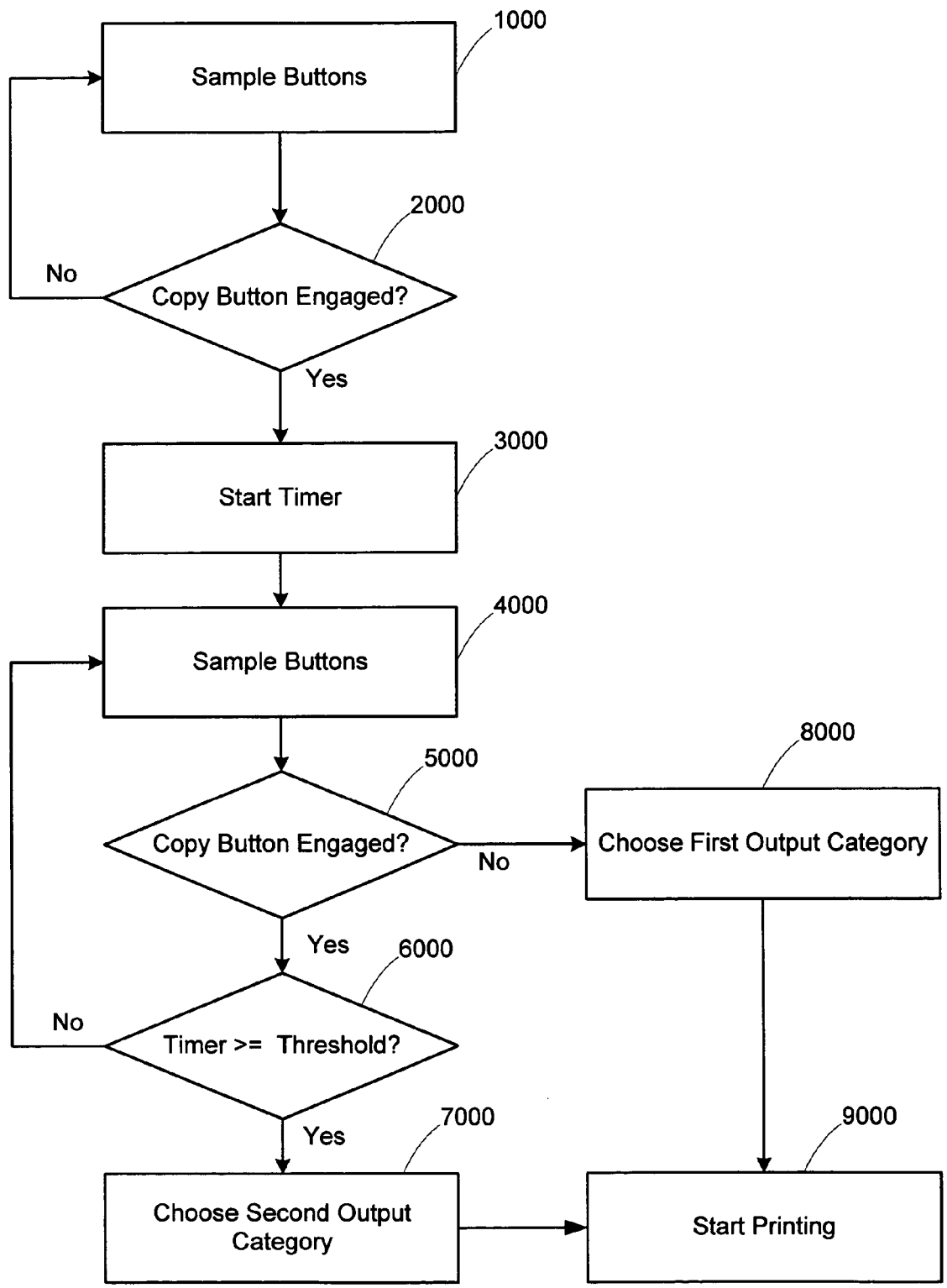
FIG. 2 is flow diagram of the typical steps carried out to control output quality.

FIG. 2 is a flow diagram showing the typical operation of device control unit 200 to determine the category of output quality based upon the time interval that either the black-and-white copy button 14 or the color copy button 15 are engaged. The remainder of this description uses black copy button 14 as an example, but it should be understood that the description also applies to color copy button 15. This functionality is typically included as firmware within device control unit 200, but can be carried out in any suitable component and in any suitable manner. At box 1000, device control unit 200 samples the buttons of control panel 100 to determine at box 2000 if black copy button 14 has been engaged. If black copy button 14 has been engaged, device control unit 200 starts a timer at box 3000.

Device control unit 200 then selectively samples the buttons of control panel 100 at box 4000 to determine at box 5000 whether black copy button 14 remains engaged. If button 14 is not still engaged, device control unit 200 signals scanner mechanism 300 at box 8000 to selectively scan the original image at an appropriate resolution and signals print mechanism 400 to use an output quality of a first category. Device control unit 200 initiates printing from print mechanism 400 at box 9000. As one example, this first category is a 300 hppi by 300 vppi scan, and 600 hdpi by 600 vdpi print using no shingling and printed with the general purpose mono cartridge (one pass).

If black copy button 14 is still engaged, device control unit 200 determines at box 6000 whether the timer value is greater than or equal to a threshold value. As one example, this threshold value is two seconds. If the timer value is not greater than the threshold value, device control unit 200 again selectively samples the buttons of control panel 100 at box 4000 and determines at box 5000 whether the black copy button 14 is engaged. If black copy button 14 is not engaged, device control unit 200 proceeds to box 8000 as described above. If button 14 remains engaged, the timer value is again compared to the threshold value at box 6000. If the timer value still is less than the threshold value, device control unit 200 again returns to box 4000 and determines at box 5000 whether black copy button 14 is still engaged. If the timer value is equal to or greater than the threshold value, at box 7000 device control unit 200 signals scan mechanism 300 to selectively scan the original image at an appropriate resolution and signals print mechanism 400 to use an output quality of a second category and then initiates printing from print mechanism 400 at box 9000. As one example, this second category is a 600 hppi by 600 vppi scan, and 600 hdpi by 600 vdpi print using 4-pass shingling and printed with the general purpose color cartridge.

Following is one example of pseudo-code that can be used to implement the above-described functionality as firmware in device control unit 200. As would be known to those skilled in the art, various other codes and steps could be used to accomplish the above-described functionality.

```
Current_Button = SampleButtons( );
If Current_Button = Copy
    START(Timer);
While ((Is_Button_Pressed(Copy)) = TRUE){
    If Timer >= HoldTime
        break;
}
If Timer >= HoldTime{
    HighQualityCopy( );
Else
    StandardCopy( );
}
```

Where the following are true:
SampleButtons is a routine in device control code that returns the status of the operator panel buttons.
Timer is a standard timer common in device code.
Is_Button_Pressed is a routine that detects if a particular button is pressed.
HoldTime is the threshold time, for example, 2 seconds.
HighQualityCopy is a routine that performs a high quality scan (600 vppi by 600 hppi) and a high quality copy (600 hdpi by 600 vdpi with 4-pass shingling in the above example).
StandardCopy is a routine that performs a standard quality scan (300 hppi×300 vppi) and a standard copy (600 hdpi by 600 vdpi with no shingling (one-pass) in the above example).

The functionality described in the foregoing flow diagram and pseudo-code also can be used in connection with color copy button 15. In addition, other suitable methods for determining the time interval in which black-and-white copy button 14 and color copy button 15 are engaged can be used.

The present invention also can accommodate the use of more than two categories of output qualities through the use of more than one threshold value for the time interval that buttons 14 and 15 are engaged. As an example, when black copy button 14 is engaged for less than two seconds, device control unit 200 would signal scanner mechanism 300 to selectively scan the original image at an appropriate resolution and signal print mechanism to use a first category of output quality. When black copy button 14 is engaged between 2 and 5 seconds, device control unit 200 would selectively signal scanner mechanism 300 to selectively scan the original image at an appropriate resolution and signal print mechanism 400 to use a second output quality category. When black copy button 14 is engaged for more than five seconds, device control unit 200 would signal scanner mechanism 300 to selectively scan the original image at an appropriate resolution and signal print mechanism 400 to use a third output category. The number of output quality categories as well as the number and duration of time intervals can be varied as desired.

It should be noted that the various aspects of the invention described herein need not necessarily be used together in a single system or method. In this regard, any of the various aspects of the present invention (e.g., device control unit 200) can be used alone or in any combination with other aspects while still falling within the spirit and scope of the present invention.

Various features and advantages of the invention are set forth in the following claims.

The invention claimed is:

1. A system for controlling output quality, the system comprising:
   a button that is engaged to initiate output; and,
   device control unit in communication with the button wherein the device control unit initiates output quality of a first category when the button is engaged for a first time interval, and the device control unit initiates output quality of a second category when the button is engaged for a second time interval.

2. The system recited in claim 1, wherein the first time interval is less than two seconds, and the second time interval is at least two seconds.

3. The system recited in claim 1, wherein the first category is of a lower print resolution than the second category.

4. The system recited in claim 3, wherein the second category print resolution is chosen from a group of resolutions comprised of:
   at least 300 dpi horizontal and at least 600 dpi vertical,
   at least 600 dpi horizontal and vertical,
   at least 1200 dpi horizontal and vertical,
   at least 2400 dpi horizontal and at least 1200 dpi vertical, and
   at least 4800 dpi horizontal and 1200 dpi vertical.

5. The system recited in claim 1, wherein the first category is of a lower scan resolution than the second category.

6. The system recited in claim 5, wherein the second category scan resolution is chosen from a group of resolutions comprised of:
   at least 75 ppi vertical and horizontal,
   at least 150 ppi vertical and horizontal,
   at least 300 ppi vertical and horizontal,
   at least 600 ppi vertical and horizontal,
   at least 1200 ppi vertical and horizontal,
   at least 2400 ppi vertical and horizontal, and
   at least 4800 ppi vertical and horizontal.

7. The system recited in claim 1, wherein the first category is a single pass shingle printing mode and the second category least a two pass shingle printing mode.

8. The system recited in claim 1, wherein the first category is a two pass shingle printing mode and the second category is at least a three pass shingle printing mode.

9. The system recited in claim 1, wherein the first category is a first output orientation and the second category is a second output orientation.

10. The system recited in claim 9, wherein the first output orientation is portrait and the second output orientation is landscape.

11. The system recited in claim 1, wherein the first category is a monochrome output and the second category is a grayscale output.

12. The system recited in claim 1, wherein the first category is a monochrome output and the second category is a color output.

13. The system recited in claim 1, further comprising a scanner mechanism in communication with the device control unit.

14. The system recited in claim 13, wherein the first category is of a lower scan resolution than the second category.

15. The system recited in claim 14, wherein the second category scan resolution is chosen from a group of resolutions comprised of:
   at least 75 ppi vertical and horizontal,
   at least 150 ppi vertical and horizontal,
   at least 300 ppi vertical and horizontal,
   at least 600 ppi vertical and horizontal,
   at least 1200 ppi vertical and horizontal,
   at least 2400 ppi vertical and horizontal, and
   at least 4800 ppi vertical and horizontal.

16. The system recited in claim 1, further comprising a printer mechanism for producing the first and second categories of output in communication with the device control unit.

17. The system recited in claim 16, wherein the first category is of a lower print resolution than the second category.

18. The system recited in claim 17, wherein the second category print resolution is chosen from a group of resolutions comprised of:
   at least 300 dpi horizontal and at least 600 dpi vertical,
   at least 600 dpi horizontal and vertical,
   at least 1200 dpi horizontal and vertical,
   at least 2400 dpi horizontal and at least 1200 dpi vertical, and
   at least 4800 dpi horizontal and 1200 dpi vertical.

19. The system recited in claim 16, wherein the first category is output produced with the printing mechanism having a first type of ink jet cartridge and the second category is output produced with the printing mechanism having a second type of ink jet cartridge.

20. The system as recited in claim 19, wherein the first type of ink jet cartridge is a color cartridge and the second type of ink jet cartridge is a photo-quality color cartridge.

21. The system as recited in claim 19, wherein the first type of ink jet cartridge is a black cartridge and the second type of ink jet cartridge is a color cartridge.

22. The system recited in claim 16, wherein the first category is a first output orientation and the second category is a second output orientation.

23. The system recited in claim 22, wherein the first output orientation is portrait and the second output orientation is landscape.

24. The system recited in claim 16, wherein the first category is a monochrome output and the second category is a grayscale output.

25. The system recited in claim 16, wherein the first category is a monochrome output and the second category is a color output.

26. The system recited in claim 1, wherein:
the first time interval is less than two seconds,
the second time interval is at least two seconds;
the first category is of a lower print resolution than the second category; and
the first category is of a lower scan resolution than the second category.

27. A system for controlling output quality, the system comprising:
a monochrome copy button that is engaged to initiate monochrome output; and,
a device control unit in communication with the monochrome copy button, wherein
the device control unit initiates a monochrome output quality of a first category when the monochrome copy button is engaged for a first time interval, and the device control unit initiates a monochrome output quality of a second category when the monochrome copy button is engaged for a second time interval.

28. The system recited in claim 27, wherein the first category is of a lower print resolution than the second category.

29. The system recited in claim 28, wherein the second category print resolution is chosen from a group of resolutions comprised of:
at least 300 dpi horizontal and at least 600 dpi vertical,
at least 600 dpi horizontal and vertical,
at least 1200 dpi horizontal and vertical,
at least 2400 dpi horizontal and at least 1200 dpi vertical, and
at least 4800 dpi horizontal and 1200 dpi vertical.

30. The system recited in claim 27, wherein the first category is of a lower scan resolution than the second category.

31. The system recited in claim 30, wherein the second category scan resolution is chosen from a group of resolutions comprised of:
at least 75 ppi vertical and horizontal,
at least 150 ppi vertical and horizontal,
at least 300 ppi vertical and horizontal,
at least 600 ppi vertical and horizontal,
at least 1200 ppi vertical and horizontal,
at least 2400 ppi vertical and horizontal, and
at least 4800 ppi vertical and horizontal.

32. The system recited in claim 27, further comprising:
a color copy button that is engaged to initiate color output and that is in communication with the device control unit, wherein the device control unit initiates a color output quality of a third category when the color copy button is engaged for a third time interval, and the device control unit initiates color output quality of a fourth category when the color copy button is engaged for a fourth time interval.

33. The system recited in claim 32, wherein the third category is of a lower print resolution than the fourth category.

34. The system recited in claim 33, wherein the fourth category print resolution is chosen from a group of resolutions comprised of:
at least 300 dpi horizontal and at least 600 dpi vertical,
at least 600 dpi horizontal and vertical,
at least 1200 dpi horizontal and vertical,
at least 2400 dpi horizontal and at least 1200 dpi vertical, and
at least 4800 dpi horizontal and 1200 dpi vertical.

35. A system for controlling output quality, the system comprising:
means for initiating output; and,
means for initiating output quality of a first category when the means for initiating output is engaged for a first time interval and of a second category when the means for initiating output is engaged for a second time interval, wherein the means for initiating output quality of a first category and second category is in communication with the means for initiating output.

36. The system recited in claim 35, further comprising means for scanning, wherein the means for scanning is in communication with the means for initiating output quality of a first category and second category.

37. The system recited in claim 36, further comprising means for printing output, wherein the means for printing output is in communication with the means for initiating output quality of a first category and second category.

38. The system recited in claim 37, wherein the first category is of a lower print resolution than the second category and is of a lower scan resolution than the second category.

39. The system recited in claim 38, wherein the second category print resolution is chosen from a group of resolutions comprised of:
at least 300 dpi horizontal and at least 600 dpi vertical,
at least 600 dpi horizontal and vertical,
at least 1200 dpi horizontal and vertical,
at least 2400 dpi horizontal and at least 1200 dpi vertical, and
at least 4800 dpi horizontal and 1200 dpi vertical, and
the second category scan resolution is chosen from a group of resolutions comprised of:
at least 75 ppi vertical and horizontal,
at least 150 ppi vertical and horizontal,
at least 300 ppi vertical and horizontal,
at least 600 ppi vertical and horizontal,
at least 1200 ppi vertical and horizontal,
at least 2400 ppi vertical and horizontal, and
at least 4800 ppi vertical and horizontal.

40. A method for controlling output quality, comprising the acts of:
engaging a button to initiate output;
initiating output quality of a first category when the button is depressed for a first time interval, and initiating output quality of a second category when the button is depressed for a second time interval.

41. The method recited in claim 40, wherein the first time interval is less than two seconds, and
the second time interval is greater than the first interval.

42. The method recited in claim 40 further comprising using a lower print resolution for the first category than for the second category.

43. The method recited in claim 42 further comprising choosing the second category print resolution from a group of resolutions comprised of:
at least 300 dpi horizontal and at least 600 dpi vertical,
at least 600 dpi horizontal and vertical,
at least 1200 dpi horizontal and vertical,
at least 2400 dpi horizontal and at least 1200 dpi vertical, and
at least 4800 dpi horizontal and 1200 dpi vertical.

44. The method recited in claim 40 further comprising using a lower scan resolution for the first category than for the second category.

45. The method recited in claim 44 further comprising choosing the second category scan resolution from a group of resolutions comprised of:
- at least 75 ppi vertical and horizontal,
- at least 150 ppi vertical and horizontal,
- at least 300 ppi vertical and horizontal,
- at least 600 ppi vertical and horizontal,
- at least 1200 ppi vertical and horizontal,
- at least 2400 ppi vertical and horizontal, and
- at least 4800 ppi vertical and horizontal.

46. The method recited in claim 40 further comprising using a single pass shingle printing mode for the first category and using at least a two pass shingle printing mode for the second category.

47. The method recited in claim 40 further comprising using a two pass shingle printing mode for the first category and using at least a three pass shingle printing mode for the second category.

48. The method recited in claim 40 further comprising using a first output orientation for the first category and using a second output orientation for the second category.

49. The method recited in claim 48, wherein the first output orientation is portrait and the second output orientation is landscape.

50. The method recited in claim 40, wherein the first category is monochrome output and the second category is grayscale output.

51. The method recited in claim 40 further comprising using an ink jet printer having a first and second type of ink jet cartridges wherein the first category is output produced with the first type of ink jet cartridge and the second category is output produced with the second type of ink jet cartridge.

52. The method recited in claim 51, wherein the first type of ink jet cartridge is a monochrome cartridge and the second type of ink jet cartridge is a color cartridge.

53. The method recited in claim 51, wherein the first type of ink jet cartridge is a color cartridge and the second type of ink jet cartridge is a photo-quality color cartridge.

54. The method recited in claim 40, wherein the first time interval is less than two seconds, the second time interval is two or more seconds, and the first category is of a lower resolution than the second category.

55. The method recited in claim 40, wherein the first category of output is in black-and-white and the second category of output is grayscale.

56. The method recited in claim 40, wherein the first category of output is in black-and-white and the second category of output is in color.

57. The method recited in claim 40 further comprising initiating output quality of a third category when the button is engaged for a third time interval.

58. The method recited in claim 57, wherein the first category is of a lower resolution than the second category and the second category is of a lower resolution than the third category.

* * * * *